Figure 1:
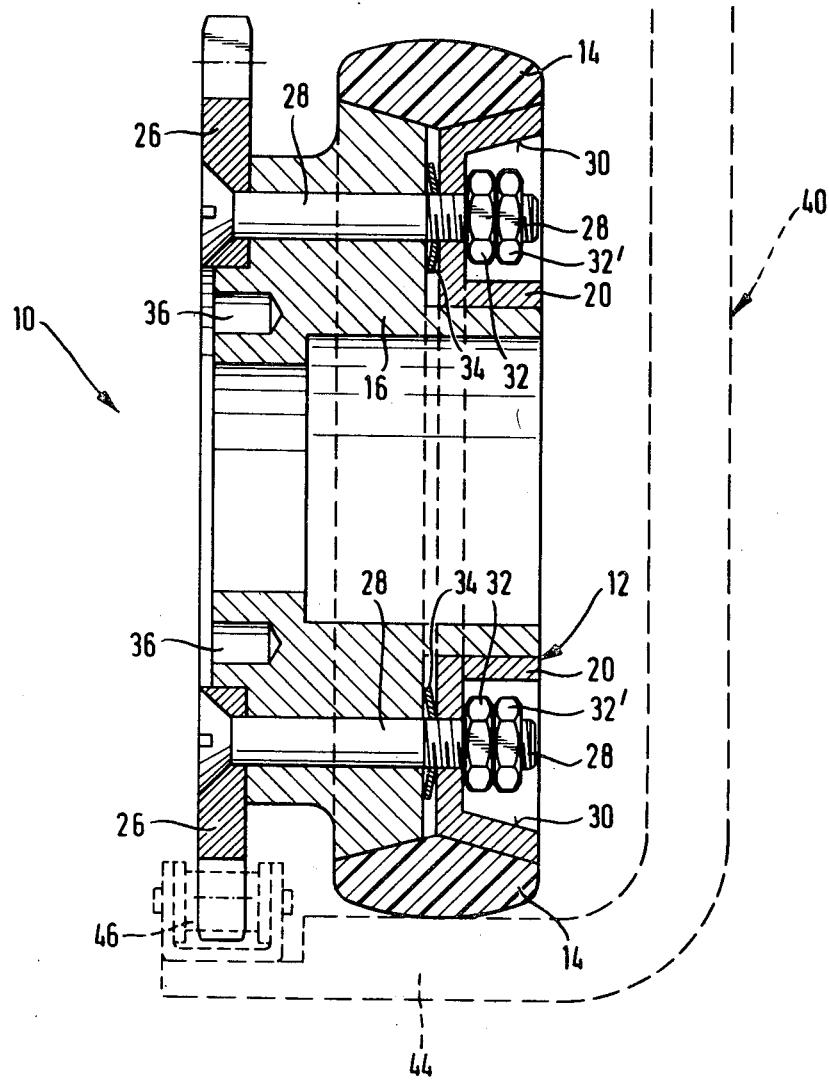

United States Patent [19]

Uttscheid

[11] Patent Number: 4,463,683
[45] Date of Patent: Aug. 7, 1984

[54] RACK AND PINION DRIVE TROLLEY WITH SLIP-RING DRIVE WHEEL

[76] Inventor: Georg Uttscheid, Madronstrasse 17, 8201 Rosenheim, Fed. Rep. of Germany

[21] Appl. No.: 396,931

[22] Filed: Jul. 9, 1982

[30] Foreign Application Priority Data

Jul. 21, 1981 [DE] Fed. Rep. of Germany ....... 3128824

[51] Int. Cl.³ ...................... B61C 11/04; B60B 17/00
[52] U.S. Cl. ................................. 105/29 R; 74/432; 104/94; 295/4; 295/20; 474/159
[58] Field of Search ................ 74/209, 212, 432; 104/93, 94; 105/29 R; 295/4, 8.5, 15, 20, 31 A; 308/6 R, 184 A, 189 A, 207 A; 474/159

[56] References Cited

U.S. PATENT DOCUMENTS

| | | | |
|---|---|---|---|
| 1,566,492 | 12/1925 | McGinness | 295/4 X |
| 3,044,820 | 7/1972 | Cox | 295/8.5 X |
| 3,443,449 | 5/1969 | Kotarski | 105/29 R |
| 3,497,089 | 2/1970 | Forster et al. | 105/29 R X |
| 4,067,260 | 1/1978 | Finsterwald | 105/29 R |

FOREIGN PATENT DOCUMENTS

| | | | |
|---|---|---|---|
| 2337284 | 7/1977 | France | 474/159 |
| 2060530 | 5/1981 | United Kingdom | 105/29 R |
| 2065050 | 6/1981 | United Kingdom | 105/29 R |
| 255708 | 10/1970 | U.S.S.R. | 74/432 |

Primary Examiner—Robert B. Reeves
Assistant Examiner—David F. Hubbuch
Attorney, Agent, or Firm—Cahill, Sutton & Thomas

[57] ABSTRACT

A motor-driven overhead trolley conveyor is described which comprises a rail having horizontal sections and inclined sections. Rack sections or chain sections are associated to the inclined sections. Each trolley comprises its own drive motor. In the horizontal sections the driving force is transmitted exclusively through a drive roller. In inclined sections the drive is effected by means of a gear meshing with the rack or chain and being driven with the same angular velocity as the drive roller. The drive roller comprises a drive wheel connected with the drive shaft as well as a ring mounted on the periphery of the drive wheel in a slide bearing fashion. By this feature, a cold working of the drive roller surface and the rail surface due to alternate stresses caused by the gear is avoided.

7 Claims, 2 Drawing Figures

U.S. Patent  Aug. 7, 1984  Sheet 1 of 2  4,463,683

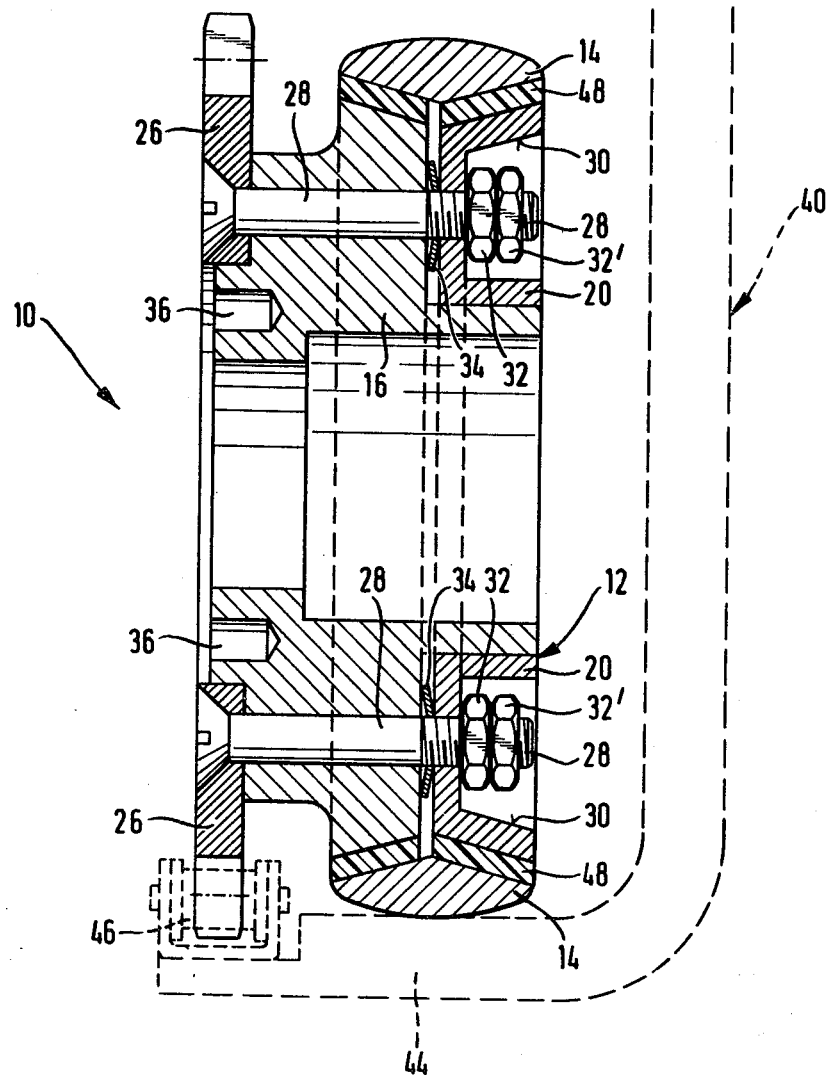

RACK AND PINION DRIVE TROLLEY WITH SLIP-RING DRIVE WHEEL

The invention refers to a motor-driven overhead trolley conveyor a runway rail comprising horizontal sections and inclined sections, with drive sections associated to the inclined rail sections and with trolleys, each of which comprises its own motor drive, which drives with equal angular velocity at least one load carrying roller rolling on the rail and at least one gear meshing with the drive sections of the rail.

Such an overhead trolley conveyor is known from German patent application No. 27 50 453. The drive roller serves for driving the trolley as well as for carrying the load. In horizontal sections of the rail, the gear is without function. However, in inclined sections of the rail, the gear meshes with the rack or chain drive section mounted in parallel relationship to the rail. Therefore in these inclined sections of the rail, the driving function is taken over by the gear, while the roller still carries the load dependent upon the steepness of the inclined rail section. With such a trolley conveyor any inclination and even a vertical rail section may be overcome. The gear is held in meshing relationship with the rack or chain by means of back pressure rollers and guide rollers.

Since the gear and the roller are driven with equal angular velocity, it is desirable that the outer diameter of the roller be equal to the pitch diameter of the gear in order to avoid velocity differences. Of course, the rack or chain must be appropriately positioned relative to the rail. Practical experience has shown that these conditions cannot be fulfilled with sufficient accuracy. There are certain tolerances with respect to the outer diameter of the roller and with respect to the pitch diameter of the gear as well as with respect to the relative positions between the rail and the rack or chain. But even in the case of a most accurate manufacturing and mounting, significant deviations may occur after a relatively short time of operation. Since about 95% of the rail sections are horizontal, the drive roller wears faster than the gear, and therefore the outer diameter of the roller becomes smaller and smaller with respect to the pitch diameter of the gear. Further, it is frequently not possible to mount the rack or the chain in the ideal positional relationship with respect to the running surface of the rail. It is for these reasons that in practical operation substantial differences between the circumferential velocity of the roller and the pitch circle velocity of the gear may occur in spite of the equal angular velocity. The difference in circumferential and pitch velocity may be for example 27 mm per revolution of the roller.

In inclined rail sections the roller is in frictional engagement with the rail, while the gear is in meshing engagement with the rack or chain. Therefore a substantial wear of the rail or the roller may occur. Further, due to the intermittent engagement of the teeth of the gear with the rack or chain, the load on the roller is intermittently increased and decreased. These effects lead to considerable cold working of the outer areas of the roller and of the rail, notably if heavy loads are to be transported. This cold working occurs in accordance with the pitch of the gear or rack. The impact occurs always at the same positions of the roller and of the rail. Even after short times of operation, the running surface of the rail in the inclined sections and the outer surface of the roller show a pattern of transverse ripples. The ripples of the roller will lead to a bumpy running characteristic in the horizontal sections of the rail. This in turn causes considerable noise as well as vibrations even to the extent that parts to be transported by the trolley may fall off.

A further disadvantage of the conventional overhead trolley conveyor arises in connection with the use of two co-axial rollers which are driven with equal angular velocity. In this case excessive slippage occurs in curves.

It is known from Austrian Pat. No. 96 582 and German Pat. No. 25 45 907 to provide additional idle rollers in co-axial arrangement with respect to the gear and the drive roller. In the inclined sections of the rail, an additional raised track is provided for supporting the idle roller while lifting the drive roller from the rail. Such a conveyor has the disadvantage of an uneven runway of the rail and a bumpy movement of the trolley.

Therefore, it is the object of the present invention to provide a motor-driven overhead trolley conveyor of the above-mentioned type which does not show an excessive wear or rippling of the running surface of the rail or of the drive rollers in inclined sections of the rail and in curves.

This problem is solved by a trolley conveyor whereby the drive roller of the trolley comprises a drive wheel connected with the drive shaft as well as a ring which is mounted in a slide bearing fashion on the periphery of the drive wheel so as to be rotatable but not axially shiftable with respect to the drive wheel.

The invention shall now be explained with reference to drawings.

FIG. 1 represents a partial cross-section through a trolley conveyor of the present invention showing the drive roller and the gear as well as their positional relationship with respect to a rail shown in phantom lines and FIG. 2 shows a cross-section through a second embodiment similar to FIG. 1.

The invention shall first be explained with reference to FIG. 1.

The drive roller 10 consists of an inner drive wheel 12 and an outer ring 14. The ring 14 consists of metal or preferably of a plastic such as teflon or polyamide. The plastic may contain a filler, such as glass fibers. In a preferred embodiment, the ring 14 consists of polyamide 6.6 with about 30% glass fiber. This material shows a sufficient hardness and strength for transporting smaller loads. The outer periphery of the ring 14 is curved so that the ring engages the plane rail practically only in one point. The inner surface of the ring 14 is a double-cone surface, whereby the apex line is located in the middle between the two side surfaces of the ring. The two cone surfaces form preferably an obtuse angle, which is in the range of from 95° to 175° and preferably in the range of from 120° to 160° or specially at about 150°.

The wheel 12 is sub-divided into two disc-shaped members along a plane which approximately coincides with the plane of the apex line of the double-cone inner surface of the ring 14. One of the members of the drive wheel is shaped as a drive wheel body 16, while the other is shaped as a drive wheel ring 20. The drive wheel ring 20 is located within a corresponding recess of the drive wheel body 16. The opposite side of the drive wheel body shows an annular shoulder for supporting a gear ring 26. The gear ring 26, the drive wheel body 16 and the drive wheel ring 20 show a plurality of aligned through-bores. Bolts 28 extend through these bores so that their free ends are located within a ring groove 30 of the ring 20. Nuts 32 are screwed onto these ends. A spring 34 is provided between the drive wheel body 16 and the drive wheel ring 20. The drive wheel body 16 and the drive wheel ring 20 exhibit together an outer periphery of a double-cone shape, which corresponds to the double-cone shape of the ring 14. Further, the drive wheel body 16 comprises bores 36 for the connection with the motor drive.

For assembling this drive roller the screws 28 are first inserted in the corresponding bores of the gear 26. Thereafter the screws are inserted in the drive wheel body 16 whereby the free ends of the screws 28 extend through the bores. Next the ring 14 is positioned onto the cone-shaped outer surface of the drive wheel body 16. Thereafter, the spring 34 is inserted. Now the drive wheel ring 20 is inserted into the recess of the drive wheel body 16 in such a fashion that the free ends of the screws 28 extend through the corresponding bores of the drive wheel ring 20. Now the nuts 32 are screwed into the free ends of the screws 28. The screws 32 are tightened, the spring 34 is tensioned. This allows an adjustment of the frictional engagement between the ring 14 on the one side and the drive wheel body 16 and the drive wheel ring 20 on the other side. Counternuts 32' may be screwed against the nuts 32.

The above described drive roller is suitable for a rail 40 with a rectangular U-crossection with an upper transverse part 42 and a lower transverse part 44. The drive roller engages the inner surface of the lower transverse part 44. The counter pressure rollers (not shown) engage the inner surface of the upper transverse part 42. Lateral stability is provided by pairs of guide rollers (not shown). The figure shows a cross-section of the rail in the area of an inclination. All inclined sections of the rail are provided with racks or chains 46. These are provided within a recess of the lower transverse part 44 in such a fashion that in the transition from a horizontal section into an inclined section the gear may smoothly run into the rack or chain.

It is preferred to choose the outer diameter of the ring 14 as close as possible to the pitch diameter of the gear 26. The rack should be arranged in a corresponding positional relationship with respect to the surface of the rail. In practice deviations occur, notably after prolonged use. These deviations lead to a difference between the circumferential velocity of the drive roller and the pitch velocity of the gear which are both driven with equal angular velocity. However, a cold working of the drive roller and the rail are prevented, since the forces generated due to the difference of the circumferential velocity and pitch velocity in the inclined sections exceed the static friction between the ring 14 and the wheel 12. Therefore, the ring 14 may turn relative to the wheel 12. Due to the double-cone-shape of the profile the ring 14 is maintained in a central position relative to the wheel 12.

In horizontal sections, the gear does not have a function. The forces are transmitted exclusively by frictional engagement between the wheel 12 and the ring 14 on the one side and between the ring 14 and the surface of the rail on the other side. It has been found that the frictional engagement between the ring 14 and the wheel 12 may be adjusted such that in horizontal sections the drive forces are properly transmitted to the drive ring. On the other hand, differences between the circumferential and pitch velocities, ocurring in inclined sections, are easily compensated by a slippage between the wheel 12 and the ring 14.

In a simplified embodiment, the spring 34 may be omitted. In a further embodiment the gear 26 is not connected to the drive wheel body 16 by means of screws. Rather, the gear is separately connected with the drive shaft of the drive motor and meshes with a rack or chain having a lateral displacement with respect to the rail. In a further embodiment the drive roller and the gear may be provided on opposite sides of the drive motor. In place of the drive roller shown in the FIG. 1, a pair of drive rollers may be provided, which are rigidly connected with each other and with the gear. In this case a rail may be used which consists of two U-profiles or a double-T-profile. With respect to such an embodiment the invention shows the added advantage of a reduced wear due to slippage phenomena in curves.

In the above described embodiments the contact surface between the ring 14 and the wheel 12 has a double-cone shape. However, the ring 14 may have any other convex inner surface, whereby the wheel 12 will have a corresponding concave outer periphery. The inner surface of the ring 14 and the outer surface of the wheel 12 may also be cylindrical surfaces. In this case, an axial displacement of the ring 14 must be prevented by flanges. In the above described embodiments of the drive roller the ring 14 has a curved outer surface for use in connection with a plane rail surface. In a modified embodiment the running surface of the rail may have the shape of an angular profile, whereby naturally the outer periphery of the ring 14 must exhibit a corresponding annular groove with a V-cross-sectional shape. Further, the rail may have a circular cross-sectional profile whereby the ring 14 must have a corresponding annular groove with a semicircular cross-section. Further, the ring 14 may exhibit a cylindrical outer surface or a concave outer surface which cooperates with a corresponding convex running surface of the rail.

The above-described embodiments are designed for smaller loads. In case of heavy loads the ring 14 consisting of plastic does not show a sufficient strength and hardness. In this case a modified embodiment of the drive roller in accordance with FIG. 2 is used.

The ring 14 consists of steel. It has an inner surface with a double-cone shape which corresponds exactly to the double-cone outer surface of the wheel. However, the inner diameter of the ring 14 is not equal to the outer diameter of the wheel 12 (in the apex) as in the embodiment shown in FIG. 1. Rather a considerable diameter difference is chosen. Two cone-shaped sleeves 48 are inserted in the interspace. These sleeves 48 may consist of bearing material, notably plastic. The same plastic materials may be used which have been mentioned in connection with the ring 14 of the above-described embodiments. In a preferred embodiment the shape of the inner periphery of the ring 14 corresponds exactly to the shape of the outer periphery of the wheel 12 so that the sleeves 48 may have an even thickness throughout their axial extension. In a modified embodiment the thickness of the sleeves 48 may increase toward the center. This has a favorable effect for the transmission of force by frictional engagement between the wheel 12, the cone-shaped sleeves 48 and the ring 14. In case of a load the cone-shaped sleeves 48 are pushed inward toward each other. This increases the frictional engagement. This effect is beneficial for the transmission of force in horizontal sections. For assembling this drive roller one cone-shaped sleeve 48 is first placed on the cone-shaped surface of the wheel body 16. Thereafter, the cone-shaped ring 14 is positioned. Now, the second cone-shaped sleeve 48 is inserted and finally the ring 20 is inserted. This assembled drive roller is held together by means of screws 28 and nuts 32, with or without an inserted spring 34.

The above-described embodiment of the invention may show a delayed torque transmission due to slippage between the ring 14 and the wheel 12 in the starting operation or breaking operation, notably if heavy loads are transported. For overcoming these difficulties a clutch mechanism (not shown) may be used which allows a selective connection with the wheel body 16 alone or with the wheel body 16 and with the ring 14. Such a clutch may be magnetically controlled for improving the starting characteristic or the breaking characteristic.

In a modified embodiment two racks or chains may be used instead of the single rack or chain shown in the drawings. The pitch of these racks or chains may have a phase-shift with respect to each other, preferably by 180°. In this case two gears are used with a corresponding phase-shift. In addition to the rack or chain connected with the lower horizontal part 44 of the rail an additional rack or chain may be connected with the upper horizontal part 42 of the rail which cooperates with the second gear, whereby both gears may be driven in opposite directions.

For improving the starting characteristic or the breaking characteristic a breaking device may be provided in a form of a magnetically actuatable disc break, which is connected with the wheel body 16 and which engages the ring 14.

I claim:

1. Motor-driven overhead trolley conveyor with a runway rail comprising horizontal sections and inclined sections and with parallel drive sections associated to the inclined rail sections and with trolleys, each of which comprises its own motor drive, which drives with equal angular velocity at least one load carrying roller rolling on the rail and at least on gear meshing with the drive sections of the rail, wherein the load carrying roller comprises a drive wheel connected with the motor drive, said load carrying roller further comprising a ring which is mounted in a slide bearing fashion on the periphery of the drive wheel so as to be rotatable but axially confined with respect to the drive wheel, said drive wheel frictionally engaging said ring whereby said ring drives the trolley along horizontal sections of the rail.

2. Conveyor according to claim 1, characterized in that the ring consists of plastic.

3. Conveyor according to claim 1, characterized in that the ring consists of metal and that a sleeve of plastic bearing material is inserted between the drive wheel and the ring.

4. Conveyor according to one of claims 1 to 3, characterized in that the outer periphery of the drive wheel has a concave shape while the inner periphery of the ring has a convex shape.

5. Conveyor according to claim 4, characterized in that the concave and convex peripheries have the shape of double-cone surfaces.

6. Conveyor according to claim 5, characterized in that the drive wheel consists of two discs bolted together.

7. Conveyor according to claim 6, characterized in that springs for adjusting the frictional engagement between the drive wheel and the ring are provided between the two discs of the drive wheel.

* * * * *